3,474,172
WOOD TREATING COMPOSITION

Robert E. Hill, Clayton, George B. Mills, Creve Coeur, and Reuben M. Morriss, Jr., Clayton, Mo., assignors to Monsanto Company, St. Louis, Mo., a corporation of Delaware
No Drawing. Filed May 8, 1967, Ser. No. 636,630
Int. Cl. A01n 9/04
U.S. Cl. 424—294                    9 Claims

ABSTRACT OF THE DISCLOSURE

The invention relates to a wood preservative composition comprising a cracked oil residue, a wood preservative and a solvent.

---

This invention relates to compositions and a method for the protection of wood products and other cellulosic materials. More particularly this invention is concerned with wood treating compositions and a method which prevents the depletion of desirable preservative materials and further imparts mechanical strength to the treated product.

The wood treating industry has long been confronted with the problem of treating wood used in various products, for example telephone poles, railroad ties and etc., to obtain a long service life. In the past years, the industry has adopted many products to impregnate wood products which have both preservative and toxic effects. To date, the prior art processes and products in this field of endeavor leave something to be desired.

The problem is difficult because of the many organic and biological causes of deterioration of wood products and because of the wide variety of climatic conditions in which such products are used; climatic conditions ranging from torrid to frigid and from arid to humid. In all climates a variety of organisms, ranging from fungi to insects, prey on the wood. A good preservative for wood must be poisonous to all sorts of organisms; it must be fungicidal as well as insecticidal and it must be of such nature that it will be resistive to leaching from the wood in wet soil or in standing water or when subjected to varied temperatures and humidity conditions. Oil preservatives such as creosote and creosote solutions are subject to vapor loss and most petroleum carriers used with oil borne preservatives such as pentachlorophenol volatize or bleed causing preservative loss or depletion.

In certain sections of the country, particularly in the so-called arid regions, the mechanical life of railroad cross-ties has been prolonged by impregnation with blends of creosote and heavy petroleum oils. In such localities, wood ties have a tendency to split, check or broom. However, wood ties in all sections of the United States are more frequently removed from service because of mechanical or physical deterioration before any appreciable decay or fungus or insect attack has occurred. Although the use of creosote petroleum and creosote coal tar solutions have become industry standards for the treatment of railroad ties against decay, the mechanical life of such treated ties leaves something to be desired. Railroad ties need a greater protection, not against decay, but against weathering, splitting, checking, water pick up and abrasion due to greatly increased equipment loads. In view of the increased requirements, there is a need for a treatment composition which will not only impart the necessary protection against decay, but will also provide for the wood tie better protection against weather and greater service life against mechanical wear.

It is therefore an object to provide improved compositions and a method for the treatment of wood.

It is a further object of the invention to provide a wood treatment composition which will prevent depletion of the wood preservative materials impregnated therewith.

It is another object of the instant invention to provide a composition which is easily applied to wood.

Further objects, advantages and features of this invention will be apparent to those skilled in the art from the following description and claims.

In accordance with this invention it has been found that when wood is treated with a composition comprising (1) a cracked oil residue of the type hereinafter described, (2) a wood preservative and (3) an aromatic solvent, the attendant disadvantages of the prior art are eliminated.

In general each 100 parts by weight of the wood preservative composition of this invention can be comprised of from about 30 to about 99.5 parts by weight of cracked oil residue, from about 0 to about 65 parts by weight of aromatic solvent and from 0.5 to about 20 parts by weight of wood preservative. In preferred formulations each 100 parts by weight of wood preservative composition comprises from about 50 to about 70 parts by weight of cracked oil residue, from about 25 to about 49 parts by weight of aromatic solvent and from about 1 to about 5 parts by weight of wood preservative.

The cracked oil residues which are disclosed herein generally have a boiling range at least 90 percent of which is above 500° F. at atmospheric pressure. This cracked oil residue is obtained by separating either by distillation, or otherwise from a total cracked oil product of the relatively severe thermal cracking of hydrocarbons substantially all of the components boiling below approximately 500° F. at atmospheric pressure. Because of the inability of practical present day separation methods to bring about precise separations, small amounts of the lower boiling components are usually retained in the cracked oil residue and account for the percent of the residue boiling below the desired range. The cracked oil residues will usually possess the following properties:

| | |
|---|---:|
| Softening point, ° F. (ASTM D–36) | 90–160 |
| Specific gravity, 77° F./77° (ASTM D–71) | 1.13–1.20 |
| Penetration at 77° F. (ASTM D–5) | 0–100 |
| Benzene solubles, wt. percent | 1.0–99.9 |
| Pentane solubles, wt. percent | 10–70 |
| Initial boiling point, ° F. | Above 390 |
| Sulfur, wt. percent | 0–1 |

A particularly preferred cracked oil residue is one obtained by the steam distillation of a total cracked oil product to an overhead temperature equivalent to approximately 500 to 600° F. at atmospheric pressure, the total cracked oil product being one obtained from thermally cracking a naturally occurring petroleum oil having a boiling range the majority of which is within the range of 80 to 1000° F. at a cracking temperature of 1400 to 1600° F. The aforedescribed preferred cracked oil residue has a softening point of about 115 to 135° F.

By relatively severe thermal cracking, as referred to herein, is meant thermal non-catalytic cracking at temperatures in excess of 900° F., generally, within the range of 900 to 2000° F. Such relatively severe thermal cracking may be further defined as cracking under conditions which produce relatively large quantities of cracked gases such as low molecular weight olefins and diolefins, i.e., ethylene, propylene, butylene, butadiene, etc.

The wood preservatives employed in the compositions of this invention can be any of a wide variety of well-known oil-soluble compounds having these protective properties. The most common wood preservatives are highly chlorinated aromatic hydrocarbons which include the polychlorophenols such as 2,3,6-trichlorophenol, 2,4,5-chlorophenol, pentachlorophenol, metal chlorophenols such as copper pentachlorophenate, zinc pentachlorophenate, nickel pentachlorophenate; other chlorinated compounds such as 2,4-dinitrochlorobenzene, chloronaphthalene, 1-chlorobetanaphthol, 2,3-chloroalphanaphthol, 2,6-dichloro-4-nitrophenol, trichlorobenzen, chloro-2-phenyl phenol, 2-chloro-4-phenyl phenol. Other common oil-soluble wood preservatives include coal tar creosote, petroleum oil creosote, wood creosote, carbolineum, copper quinolinolate, copper naphthenate, beta naphthol, orthophenyl phenol, etc., metal organic compounds such as copper resinate, copper abietinate, zinc naphthenate, zinc resinate, zinc abietinate, ethyl mercuric oleate, phenyl mercuric oleate; nitro compounds such as orthonitrotoluene, paranitrotoluene, nitrobetanaphthol and the mixtures of such compounds. The wood preservatives may be alone or in combination.

In general, the solvents suitable for use in the compositions of this invention are aromatic in nature and slow to volatilize. Examples of the solvents which can be used in formulating the compositions of this invention include xylene, toluene, cumenes, mesitylenes, phenols, benzene, ethylbenzene, n-propylbenzene and the like; halogenated aromatic hydrocarbons such as chlorobenzene, dichlorobenzene, dibromobenzene and the like; nitro derivatives of aromatic hydrocarbons such as nitrobenzene, nitrochlorobenzene and the like; and hydrocarbon derivatives such as naphthalene concentrate heavy ends, $C_9$ aromatics, petroleum distillates and the like. Preferred solvents include aromatic distillates boiling within the range of 130° C. to about 200° C.

A particularly preferred solvent is an aromatic distillate, hereinafter referred to as resin oil A having the following physical characteristics:

| | |
|---|---|
| Gravity, ° API | 19–21 |
| Flash point, P.M.C.C. | 105–115 |
| Visc. at 100° F. S.U.S. | 25–35 |
| Aromatics, vol. percent | 70–80 |
| Sulfur, wt. percent | 0.02–0.05 |
| Pour point, F. | <–20 |
| ASTM distillation, ° F.— | |
| IBP | 300–320 |
| 10% | 320–340 |
| 50% | 340–355 |
| 90% | 365–385 |
| EP | 400–450 |

Although a preferred embodiment of this invention provides for the use of an aromatic solvent with the cracked oil residue and wood preservative, it is to be understood that the invention is not so limited. It will be apparent to those skilled in the art that by proper choice of the cracked oil residue, it will be unnecessary to use a solvent in preparing a wide variety of cracked oil residue-preservative compositions. Selection of a solvent for the compositions of this invention is generally governed by the viscosity required to give the desired penetration into the wood.

The compositions of the invention are readily prepared by mixing the cracked oil residue and preservative alone or in the presence of an aromatic solvent and heating said mixture to a temperture at which a homogeneous blend is obtained. This temperature may vary from about 160° F. to about 300° F. depending upon the characteristics of the cracked oil residue employed. However, generally, a temperature of about 200° F. is required.

In carrying out the practice of this invention any one of various well-known methods of treating wood may be used, depending on the desired treatment in the wood product and in particular the degree of penetration desired. Such methods include brushing, spraying, dipping, soaking and pressure impregnation. Pressure treatments include empty cell and full cell procedures.

In the soaking procedure, the wood can be fastened down in an open tank containing the solution. Over a period of time, the air in the pores of the wood is displaced by the liquid. The unabsorbed solution is then drawn off.

In the empty cell procedure, the wood is placed in a pressure impregnation. Pressure treatments include empty cell and full cell procedures.

In the soaking procedure, the wood can be fastened down in an open tank containing the solution. Over a period of time, the air in the pores of the wood is displaced by the liquid. The unabsorbed solution is then drawn off.

In the empty cell procedure, the wood is placed in a pressure vessel, commonly a horizontal cylinder, and moderate air pressure is applied. An impregnant solution is then forced into the cylinder and into the wood. Pressure of up to 100–150 pounds per square inch gauge is applied forcing the impregnant solution deep into the wood. The presure is then released and the unabsorbed solution is removed from the cylinder. A vacuum is then applied and the residual air in the capillaries of the wood expands, thereby forcing the excess liquid in the pores from the wood. The wood pores are thus covered with a thin film of impregnant.

The full cell pressure procedure involves the application of a high vacuum initially to the pressure vessel containing the wood. An impregnating solution is added to the cylinder and surrounds the wood while the vacuum is maintained. Positive pressure is then applied to force the impregnant into the wood. At the end of the impregnation, the pressure is released. A final vacuum is applied. and the unabsorbed solution is removed from the cylinder.

Various modifications of the empty cell and full cell procedures may be used. For example, the impregnating solution may initially be admitted to the treating cylinder under atmospheric pressure in either procedure, or under a low vacuum.

Of the various well-known methods of treating wood, pressure impregnation is found to be the most practical since effective distribution of the wood preservative composition is obtained in the wood.

Suitable woods which can be impregnated in accordance with the present invention are the hard and soft woods which can be green or seasoned, exemplary varieties being maple, mahogany, walnut, hickory, gum, oak and other hard woods, as well as southern pine, ponderosa pine, Douglas fir, hemlock, larch, redwood, jack pine, lodgepole pine, red pine, northern white pine, sugar pine, western white pine, ash, black locust, honey locust, beech, birch, red cedar, white cedar and other softwoods.

The wood preservative compositions of this invention are suitable for treating such wood products as electric power and telephone poles, cross arms, railroad crossties, switch ties, fence posts, construction timbers such as joists, girders, rafters and studding, bridge timbers, mine props and timbers, wood blocks for floors and platforms, piling and timbers for bridge marine construction and the like.

The invention will be more fully understood by reference to the following examples. These examples, however, are given for the purpose of illustration only and are not to be construed as limiting the scope of the present invention in any way.

EXAMPLES 1 THROUGH 3

A series of compositions are prepared using various blends of the cracked oil residue, aromatic solvent and wood preservative. The compositions of Examples 1 and 3 are prepared by heating a mixture of the cracked oil residue, resin oil A and pentachlorophenol to 200° F. to form a homogeneous blend. In the preparation of the composition of Example 2 the cracked oil residue is heated to a temperature of about 390° F. and then blended with the resin oil A. The pentachlorophenol is then added to the blend. The viscosity characteristics of the compositions are summarized in Table I which follows.

TABLE I

| Composition | Parts by Weight Example No. | | |
|---|---|---|---|
| | 1 | 2 | 3 |
| Cracked oil Residue [1] | 60 | 65 | 70 |
| Resin oil A | 38 | 33 | 28 |
| Pentachlorophenol | 2 | 2 | 2 |
| Viscosity at 210° F. SUS | 44.2 | 54.0 | 64.2 |

[1] M.P. 120–125° F.

EXAMPLE 4

4″ x 4″ x 30″ specimens of southern yellow pine are treated with the wood preservative composition represented by Example 2 using the full cell method with no final vacuum. The treatment is carried out at 200 p.s.i. for approximately 2 hours. The temperature of the treating solution is maintained at 202 to 220° F. The samples contain both sapwood and heartwood. A retention of the solution of 26.5 lbs. per cu. ft. is obtained. The pine specimens after treatment drained to a clear non-bleeding surface.

The hardness of the wood treated in accordance with this example is obtained by determining the amount of hydraulic pressure required to force a steel bearing into the wood for a distance of one half its diameter. A 0.9 inch diameter and a 1.75 inch diameter steel bearing are used in the testing procedure. The results obtained with untreated and treated pine are as follows:

| Treatment | | Soln. Retention, lbs./cu. ft. | Pressure, p.s.i. | |
|---|---|---|---|---|
| | | | 0.9″ ball | 1.75″ ball |
| Wood: Pine | Creosote | 34.2 | 2,030 | 7,200 |
| Do | Untreated | | 2,150 | |
| Do | Example 4 | 26.5 | 2,350 | 8,60 |

EXAMPLE 5

A 4″ x 4″ x 30″ specimen of southern yellow pine is treated with the solution of Example 2 in the same manner as Example 4. Examination of the specimen after treatment shows complete penetration and a retention of the solution in the wood of 28.5 lbs. per cu. ft.

EXAMPLE 6

Following the procedure of Example 4, a 4″ x 4″ x 30″ specimen of red oak is treated with the solution of Example 2. A retention of solution of 2.8 lbs. per cu. ft. is obtained.

EXAMPLE 7

Following the procedure of Example 6, a 4″ x 4″ x 30″ specimen of red oak is treated with the solution of Example 2. A retention of solution of 3.12 lbs. per cu. ft. is obtained.

EXAMPLE 8

4″ x 4″ x 30″ specimens of red oak are treated with the solution of Example 2. Examination of the specimens before final vacuum shows a retention of solution of 2.5 lbs./cu. ft. After a 30 minute final vacuum of 26–27 inches of mercury, a retention of solution of 1.8 lbs./cu. ft. is obtained. The specimens do not tend to bleed and the surfaces after cooling are clean and dry.

EXAMPLE 9

A 4″ x 4″ x 30″ specimen of southern yellow pine treated in accordance with the procedure of Example 5 is subjected to continual exposure to the outdoors for a period of ten months. The surface of the wood remains clean and exhibits no bleeding.

EXAMPLES 10 THROUGH 14

A series of compositions represented by Examples 10 through 14 in Table II are prepared by melting the cracked oil residue and stirring with the resin oil A and toxicant at a temperature of 160 to 210° F. until a homogeneous blend is obtained. Ponderosa pine wafers measuring ¼″ x 1½″ x 10″ are treated with the resulting composition as follows: The wafers are first conditioned at 75% humidity at 78° F. then dipped and covered with the aforedescribed solution at 180° F. A vacuum is first applied to remove the entrapped air from the wood and then released to allow the solution to penetrate the wood. Each wafer exhibits complete penetration by the wood treating solution and a clean surface.

TABLE II

| Composition | Parts by Weight Example No. | | | | |
|---|---|---|---|---|---|
| | 10 | 11 | 12 | 13 | 14 |
| Cracked oil Residue [1] | 65 | 59 | 50 | 66 | 59 |
| Resin Oil A | 32 | 32 | 32 | 32 | 32 |
| Pentachlorophenol | 3 | 9 | 18 | | |
| Copper Naphthenate | | | | 2 | 9 |

[1] M.P. 120–125° F.

Comparable results are obtained using various other solvents and wood preservatives hereinbefore described. In the treatment of other woods previously disclosed equally satisfactory and advantageous results are obtained.

The preservative compositions of this invention may be modified by the addition thereto of secondary materials, such as wetting agents, water repellants, insect repellants, fire retardants, substances which exert a synergistic action on the metal chlorophenates and other materials having a favorable action on the impregnation or penetration of the composition, or have a desirable action in further protecting or enhancing the value of the treated article.

While this invention has been described with certain embodiments it is not so limited and it is to be understood that variations and modifications thereof may be made which are obvious to those skilled in the art without departing from the spirit or scope of this invention.

The embodiments of the invention in which an exclusive property or privilege is claimed are defined as follows:

1. A wood preservative composition comprising from about 30 to about 99.5 weight percent of a cracked oil residue obtained by separating the cracked oil product resulting from relatively severe thermal cracking of petroleum at a temperature of from about 1400 to about 1600° F., said cracked oil residue having a boiling range at least 90 percent by weight of which is above 500° F. at atmospheric pressure, from about 0 to about 65 weight percent of a solvent that is aromatic in nature and slow to volatilize, and from about 0.5 to about 20 weight percent of a wood preservative.

2. A composition of claim 1 wherein said cracked oil residue has a softening point of from 90 to 160° F., a specific gravity at 77° F. of 1.13 to 1.20, penetration at 77° F. of 0 to 100, benzene solubles of 1.0 to 99.9 percent, pentane solubles of 10 to 70 percent, an initial boiling point of above 390° F. and a sulfur content of 0 to 1 percent.

3. A composition of claim 1 wherein the cracked oil residue has a softening point of 115 to 125° F.

4. A composition of claim 1 wherein the aromatic solvent is an aromatic distillate having an API gravity of 19 to 21, a viscosity at 100° F. of 25 to 35 S.U.S., an aromatic content of 70 to 80 percent, a sulfur content of 0.02 to 0.05 percent and an initial boiling point of 300 to 320° F.

5. A composition of claim 1 wherein the wood preservative is pentachlorophenol.

6. A wood preservative composition comprising 65 weight percent of cracked oil residue having a softening point of 115 to 125° F., 33 weight percent of an aromatic distillate having an API gravity of 19 to 21, a viscosity at 100° F. of 25 to 35 S.U.S., an aromatic content of 70 to 80 percent, a sulfur content of 0.02 to 0.05 percent and an initial boiling point of 300 to 320° F., and 2 weight percent of pentachlorophenol.

7. A composition of claim 1 wherein the wood preservative is copper naphthenate.

8. A wood preserving process which comprises contacting the wood with a wood preserving amount of a composition comprising from about 30 to about 99.5 weight percent of a cracked oil residue obtained by separating the cracked oil product resulting from relatively severe thermal cracking of petroleum at a temperature of from about 1400 to about 1600° F., said cracked oil residue having a boiling range at least 90 percent by weight of which is above 500° F. at atmospheric pressure, from about 0 to about 65 weight percent of a solvent that is aromatic in nature and slow to volatilize and from about 0.5 to about 20 weight percent of a wood preservative.

9. A wood preserving process which comprises contacting the wood with a wood preserving amount of a composition comprising 65 weight percent of cracked oil residue having a softening point of 115 to 125° F., 33 weight percent of an aromatic distillate having an API gravity of 19 to 21, a viscosity at 100° F. of 25 to 35 S.U.S., an aromatic content of 70 to 80 percent, a sulfur content of 0.02 to 0.05 percent and an initial boiling point of 300 to 320° F., and 2 weight percent of pentachlorophenol.

References Cited

UNITED STATES PATENTS

| | | | |
|---|---|---|---|
| 3,061,508 | 10/1962 | Morriss et al. | 167—42 |
| 3,318,801 | 5/1967 | Alexander et al. | 208—40 |

OTHER REFERENCES

Wood Preservation During the Last 50 Years, Van Groenou et al., 1951, pp. 179–181.

The Petroleum Handbook, Royal Dutch/Shell Group, 1959, p. 201.

Data Sheet, Monsanto Aromatic Distillate, Monsanto Chemical Company, Hydrocarbons Division, St. Louis, Mo. (7/1564).

ALBERT T. MEYERS, Primary Examiner

JAMES V. COSTIGAN, Assistant Examiner

U.S. Cl. X.R.

424—167, 347, 358